United States Patent [19]

Enomoto

[11] 4,422,742
[45] Dec. 27, 1983

[54] PHOTOGRAPHING MODE SWITCHING DEVICE FOR A CAMERA

[75] Inventor: Fujio Enomoto, Hachioji, Japan

[73] Assignee: Olympus Optical Company Ltd., Tokyo, Japan

[21] Appl. No.: 375,740

[22] Filed: May 7, 1982

[30] Foreign Application Priority Data

Jul. 27, 1981 [JP] Japan ............................ 56-112015[U]

[51] Int. Cl.³ .................... G03B 7/083; G03B 15/05
[52] U.S. Cl. .................................... 354/413; 354/456
[58] Field of Search ................ 354/32, 34, 50, 51, 354/139, 149

[56] References Cited

U.S. PATENT DOCUMENTS 4,166,680 9/1979 Maitani ..................... 354/139 X
4,357,087 11/1982 Ikawa et al. ............... 354/139 X

*Primary Examiner*—Michael L. Gellner
*Attorney, Agent, or Firm*—Weinstein & Sutton

[57] ABSTRACT

A photographing mode switching device for a camera includes a position detecting member associated with a mode switching member and a mounting detecting member which detects the mounting of an electronic flash on the camera. A flash photographing mode is established only when the both detecting members indicate that the mode switching member has been displaced to a position where a flash photography is enabled and that the electronic flash has been mounted on the camera.

8 Claims, 9 Drawing Figures

PHOTOGRAPHING MODE SWITCHING DEVICE FOR A CAMERA

BACKGROUND OF THE INVENTION

The invention relates to a photographing mode switching device for a camera, and more particularly, to such a device for use with a camera on which an electronic flash is detachably mounted and wherein a selective switching is permitted between an EE photographing mode under natural light and a flashlight photographing mode.

Photographic cameras are known which are adapted to be used in combination with an electronic flash that is detachably mounted thereon and in which a movement of a photographing mode switching member disposed within the camera to a position where a flash photography is activated establishes a flash photography mode of the camera by presetting a given exposure period to be used during the flash photography while simultaneously turning on a power switch of an electronic flash mounted thereon, thus activating the electronic flash. A camera of the kind described which is available in the prior art is convenient in use in that the operation is simplified, inasmuch as the operation of a single member allows a switching of the photographing mode of the camera simultaneously with the activation of the electronic flash.

However, in the camera of the kind described, when the electronic flash is dismounted from the camera while the mode switching member assumes a position which enables a flash photography, the camera is left in its flash photography enabled condition even though no electronic flash is mounted thereon. This results in an inconvenience that a proper exposure cannot be achieved if a picture is taken when a photographer has forgotten to return the mode switching member. Another inconvenience experienced is the fact that a proper exposure may also be precluded as a result of an inadvertent operation of the mode switching member.

SUMMARY OF THE INVENTION

It is an object of the invention to provide a photographing mode switching device for a camera which eliminates the described disadvantages of the prior art, by providing a first and a second detecting member which detects the position of a photographing mode switching member and the mounting or dismounting of an electronic flash, so that a flash photographing mode is enabled only when the both detecting members have detected the mode switching member in its flash photography enabling position and the mounting of the electronic flash, respectively.

With an arrangement of the invention, if the mode switching member does not assume a position which enables a flash photography or if an electronic flash is not mounted on the camera, a flash photographing mode is not enabled, leaving the camera in its EE photographing mode which takes place under usual natural light. In this manner, an improper exposure which might result from an inadvertent operation or forgetting the operation of the mode switching member is avoided.

DESCRIPTION OF PREFERRED EMBODIMENTS

Figure 1:
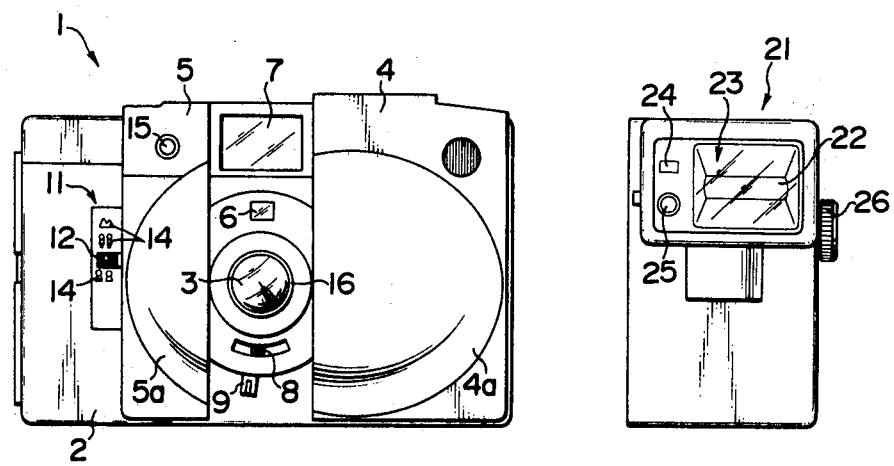
FIG. 1 is a front view of a photographic camera incorporating a photographing mode switching device of the invention, together with an associated electronic flash.

Referring to FIG. 1, there is shown a camera 1 incorporating a photographing mode switching device of the invention, generally illustrating the appearance thereof. The camera 1 includes a body 2 having a taking lens 3 centrally disposed in its front side. A lens protective cover 4 is disposed so as to be movable between a first position in which it closes the taking lens 3 and a second position in which it permits the lens 3 to be exposed. The protective cover 4 includes a front wall disposed in opposing relationship with the front surface of the body 2 in a region of right-hand half thereof so as to be slidable in spaced and parallel relationship with such front surface. It should be noted that the front wall is formed to define centrally a semi-ellipsoidal bulge 4a projecting forwardly, beginning from the left-hand end thereof, substantially in the form of a right-hand half of an ellipsoid in order to avoid its abutment against a lens barrel 16 associated with the taking lens 3 which projects forwardly to a distance from the front surface of the body 2.

An abutment frame 5 is formed integrally with the body 2 to the left of the taking lens 3 for abutment against the left-hand end face of the protective cover 4 whenever the latter has moved to a position where it closes the taking lens 3. As shown, the central portion of the frame 5 projects forwardly to define a semi-ellipsoidal bulge 5a which begins from the right-hand end thereof. When the protective cover 4 closes the taking lens 3, the both bulges 5a, 4a form together a substantially integral ellipsoid.

The protective cover 4 is adapted to cover a light receiving window 6 provided for purpose of photometry at a location above the lens 3, a finder objective window 7 disposed above the window 6, a knob 8 disposed below the taking lens 3 to preset film speed, and another knob 9 disposed below the knob 8 for enabling a flash photography, simultaneously with and in addition to the taking lens 3. When the protective cover 4 is moved to a position where the taking lens 3 is exposed, the windows 6, 7 and the knobs 8, 9 are also exposed on the front surface of the body 2.

Toward the left-hand end on the front surface of the body 2, a distance adjustment assembly 11 is disposed to the left of the frame 5. The assembly 11 includes a knob 12 which is movable to permit an adjustment of the focal length of the taking lens 3, and three zone focus indices 14 in the form of pictures or figures. These indices are provided for the purpose of providing a general indication of distance only, and the knob 12 is continuously movable from infinity, indicated by a chevron-shaped index which is located uppermost, to a nearest point indicated by half figures.

In FIG. 1, numeral 15 indicates a window which is used to provide a visible display of a self-timer and a battery checker. A devoted electronic flash 21 is shown which can be detachably mounted on the right-hand sidewall of the camera 1. The electronic flash 21 includes a generally rectangular, elongate box having a front face in which a window 23 is formed adjacent to its top end to allow the emission of light from a flash discharge tube 22. Located to the left of the window 23 are a window 24 which is used to indicate film speed, and a photometry window 25 which is utilized to enable an automatic interruption of the emission of light from the tube 22. The electronic flash 21 includes a screw member, not shown, which extends horizontally therethrough and which may be threadably engaged with a threaded bore, not shown, formed in the right sidewall of the body 2 to secure the electronic flash on the camera 1. It is to be noted that the screw member is integral with a knob 26 which projects from the right sidewall of the electronic flash 21. Thus, by turning the knob 26, the free end of the screw may be engaged with the threaded bore.

Figure 2:
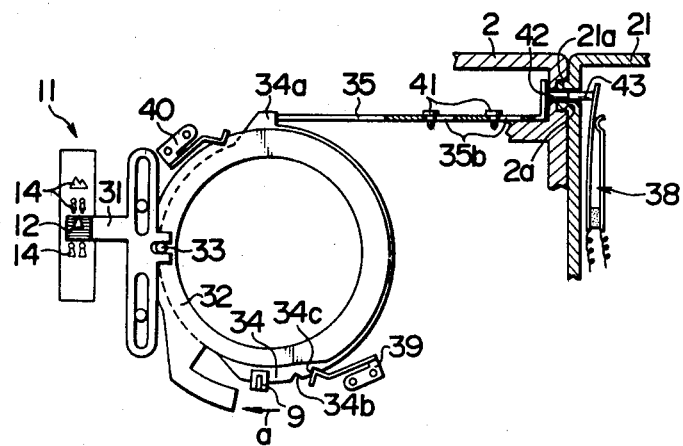
FIG. 2 is a front view of a photographing mode switching device for a camera according to one embodiment of the invention.

FIG. 2 shows a photographing mode switching device for camera according to one embodiment of the invention which is disposed within the camera 1. The device essentially comprises a flash photography enabling knob 9 which represents a photographing mode switching member, a flash enabling ring 34 on which the knob 9 is integrally formed, a flash interlock member 35 which slides horizontally as the ring 34 moves angularly, a position detecting switch 36 (see FIG. 3) which is closed as the flash interlock member 35 moves to a position where a flash photography is enabled, a mounting detecting switch 37 (see FIG. 3) which is closed as the electronic flash 21 is mounted on the camera 1, a power switch 38 disposed within the electronic flash 21 and adapted to be closed as the flash interlock member 35 moves to a position where a flash photography is enabled.

The flash enabling ring 34 is in the form of an annular strip which is disposed in concentric relationship with and behind a distance presetting ring 32, and fixedly carries the knob 9 on its front face toward the bottom thereof. Toward its top, the ring 34 is formed with a tab 34a which projects upwardly for driving the flash interlock member 35. Toward its bottom and slightly displaced to the right thereof, the peripheral edge of the flash enabling ring 34 is formed with a pair of closely spaced notches 34b, 34c, each of which is operable to receive the V-shaped end of a leaf spring member 39, having its other end secured to a stationary member, not shown, thus defining a click stop which temporarily locks the ring 34 at positions corresponding to the EE photographing mode under natural light and the flash photographing mode.

Figure 3:
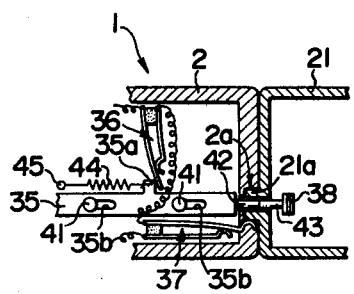
FIG. 3 is a schematic plan view, partly in section, of the switching device shown in FIG. 2.

The flash interlock member 35 is formed by a horizontal bar-shaped member, which is slidable in the horizontal direction by the provision of elongate slots 35b (see FIG. 3) formed therein which are engaged by guide pins 41 fixedly mounted on a stationary member, not shown. As shown in FIG. 3, intermediate its length, the member 35 is provided with an actuator lug 35a on its one lateral side which serves closing the position detecting switch 36. The right-hand end of the flash interlock member 35 is bent to extend upwardly, with an actuator member 42 fixedly connected to the right-hand side thereof for closing the power switch 38 disposed within the electronic flash 21. The actuator member 42 extends through a central opening formed in the bottom of a connection recess 2a which is formed in the right sidewall of the body 2 so as to be located opposite to a driven member 43, which is disposed within the electronic flash 21. The driven member 43 is fixedly carried by one of movable contacts of the power switch 38, and the resilience of the contact urges the driven member to extend through a central opening formed in a connection boss 21a which is formed on the left sidewall of the electronic flash 21 so as to be located opposite to the actuator member 42. The power switch 38 is closed during a flash photography to initiate the charging of a main capacitor, not shown, of the electronic flash 21. As schematically shown, a coiled tension spring 44 of a reduced resilience has its one end anchored to the lug 35a and its other end secured to a stationary pin 45, whereby the flash interlock member 35 is urged to the left. However, the resulting movement of the interlock member 35 is limited by the abutment of the left-hand end face of the member 35 against the tab 34a on the flash enabling ring 34.

Figure 4:
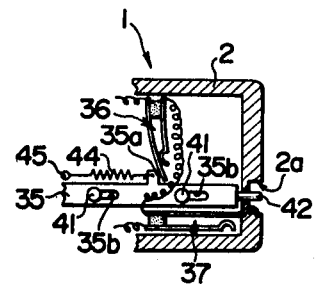
FIG. 4 is a schematic plan view, partly in section, of the device shown in FIG. 2 when the electronic flash is dismounted from the camera.

As shown in FIG. 3, the position detecting switch 36 is formed by leaf springs disposed adjacent to the flash interlock member 35, and is closed as the free end of one of the movable contacts is driven by the lug 35a. When the lug 35a moves away from such contact, the resilience of the leaf spring allows the switch 36 to be opened. FIG. 3 also shows the mounting detecting switch 37 which is again formed by leaf springs disposed forwardly of the flash interlock member 35. One of the movable contacts has a V-shaped end which extends into the connection recess 2a (see FIG. 4). When the electronic flash 21 is mounted on the camera 1, the connection boss 21a presses against the V-shaped end of the movable contact to close the switch 37. However, when the electronic flash 21 is dismounted from the camera 1, the resilience of the movable contact itself allows the switch 37 to be opened.

Figure 5:
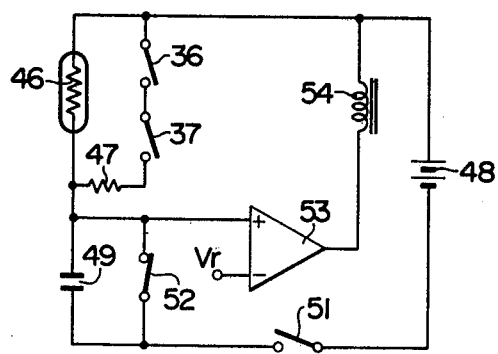
FIG. 5 is a circuit diagram of a shutter control circuit including a position detecting switch and a mounting detecting switch shown in FIGS. 3 and 4.

The position detecting switch 36 and the mounting detecting switch 37 are connected in series with each other as shown in FIG. 5, to connect a time constant resistor 47 which determines an exposure period to be used during a flash photography, in shunt with a light receiving element 46 such as a photoconductor in an electrical shutter control circuit. Specifically, one of the blade contacts of the position detecting switch 36 is connected to one of the movable contacts of the mounting detecting switch 37 by means of a lead wire, as schematically indicated in FIG. 3, while the other movable contact of the position detecting switch 36 is connected to one end of the element 46 and the other movable contact of the mounting detecting switch 37 is connected to one end of the resistor 47, as shown in FIG. 5.

In the shutter control circuit shown in FIG. 5, said one end of the light receiving element 46 is connected to the positive terminal of a battery 48 which is used as a power supply in the camera 1 while its other end is connected to the other end of the resistor 47. The junction between the element 46 and the resistor 47 is connected to one end of an integrating capacitor 49, the other end of which is connected to the negative terminal of the battery 48 through a power switch 51, which is closed in interlapped relationship with a shutter release operation. A trigger switch 52 is connected in shunt with the capacitor 49 so as to allow the initiation of an integrating operation by the capacitor. The junction between the element 46 and the capacitor 49 is connected to the non-inverting input of a comparator 53, the inverting input of which is supplied with a reference voltage Vr. The output of the comparator 53 is connected to the positive terminal of the battery 48 through an energizing coil of an electromagnet which maintains the shutter open.

Returning to FIG. 2, a distance adjusting member 31 fixedly carries the distance adjusting knob 12 on one end thereof. A distance presetting ring 32 is disposed to cause a translational movement of the taking lens 3 in the direction of the optical axis thereof as it turns. A connection pin 33 couples the distance adjusting member 31 and the distance presetting ring 32 together. A leaf spring 40 acts as a click stop which temporarily stops the distance presetting ring 32 at a selected position.

In operation, when it is desired to establish a flash photographing mode of the camera 1, the electronic flash 21 is mounted on the camera 1 initially. Thereupon, the connection boss 21a fits in the connection recess 2a as shown in FIG. 3, whereby the mounting detecting switch 37 is closed. Subsequently, the flash photography enabling knob 9 is turned to the left, as indicated by an arrow a shown in FIG. 2, whereby the flash enabling ring 34 rotates clockwise. This causes the flash interlock member 35 to be driven by the lug 34a to move to the right, whereby the lug 35a closes the position detecting switch 36. In addition, the actuator member 42 operates upon the driven member 43 to close the power switch 38. When the position detecting switch 36 is closed and the mounting detection switch 37 is closed as the electronic flash 21 is mounted, it will be seen that the resistor 47 is connected in parallel with the light receiving element 46 in the circuit arrangement of FIG. 5, thus establishing an exposure period to be used during a flash photography. The closure of the power switch 38 initiates a charging of the main capacitor (not shown) contained within the electronic flash 21.

After the completion of charging of the main capacitor, a shutter release button (not shown) may be depressed, whereupon the power switch 51 is closed to activate the shutter control circuit, energizing the electromagnet 54. Then the trigger switch 52 is opened in synchronized relationship with the initiation of a shutter operation, whereby an exposure period begins to be counted. Since the position detecting switch 36 and the mounting detecting switch 37 are closed in the manner mentioned above to connect the resistor 47 in parallel with the photometric element 46 to thereby form a time constant circuit having a given time constant, by cooperating with the capacitor 49. Accordingly, in response to the opening of the trigger switch 52, the capacitor 49 is charged relatively rapidly, thus counting the exposure period. Therefore, the potential at the non-inverting input of the comparator 53 increases to a value which exceeds the reference voltage Vr applied to the inverting input thereof after a given time interval which is determined by the time constant. Thereupon, the output from the comparator 53 reverses from its "LOW" to its "HIGH" level, deenergizing the electromagnet 54 to close the shutter. In the meantime, the voltage across the main capacitor is applied to the flash discharge tube in synchronized relationship with the full opening of the shutter to cause the emission of flashlight therefrom.

When the electronic flash 21 is dismounted under the condition that the knob 9 is operated to enable a flash photography, the boss 21a retracts out of the connection recess 2a, whereby the mounting detecting switch 37 is opened. Accordingly, the time constant resistor 47 ceases to be connected in circuit with the photometric element 46. Accordingly, when a shutter release button is depressed another time, the integrating capacitor 49 is charged by only the current which flows through the photometric element 46, thus allowing an EE photographing mode under natural light. Since the element 46 exhibits a conductivity or resistance which varies in accordance with the brightness of an object being photographed, the capacitor 49 is charged at a corresponding rate. When the capacitor is charged to the magnitude of the reference voltage Vr, the output of the comparator 53 reverses to deenergize the electromagnet 54.

If the knob 9 is inadvertently operated when the electronic flash 21 is not mounted on the camera 1, the failure of closure of the mounting detecting switch 37 establishes the EE photographing mode under natural light, in the same manner as when the electronic flash 21 is dismounted.

On the other hand, if the knob 9 is not operated, the position detecting switch 36 remains open if the electronic flash 21 is mounted on the body 2, so that the EE photographing mode under natural light is enabled.

Figure 6:
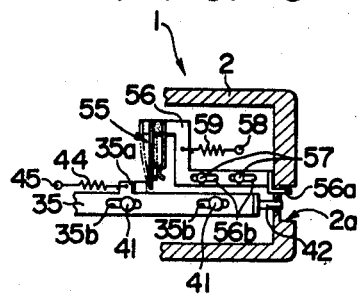
FIG. 6 is a schematic plan view, partly in section, of a photographing mode switching device for a camera according to another embodiment of the invention.

FIG. 6 shows another embodiment of the invention. In contrast to the arrangement of FIGS. 2 to 5 in which the device comprises the position detecting switch 36 and the mounting detecting switch 37 connected in series, the mode switching device of this embodiment comprises a single position detecting switch 55 which establishes an exposure period to be used during a flash photography, and a mounting detecting member 56 which causes a displacement of the switch 55 to its operative position. Specifically, the mounting detecting member 56 is slidably disposed within the body 2 so that a tab 56a folded from one end thereof extends into the connection recess 2a. The position detecting switch 55 is attached to the other end of the member 56. The detecting member 56 is formed by a crank-shaped strip in which elongate slots 56b are formed and engaged by stationary guide pins 57, thus allowing the member 56 to slide horizontally in either direction. A coiled tension spring 59 has its one end anchored to a stationary pin 58 and its other end engaged with the detecting member 56, which is therefore biased so that the tab 56a extends into the recess 2a.

Figure 7:
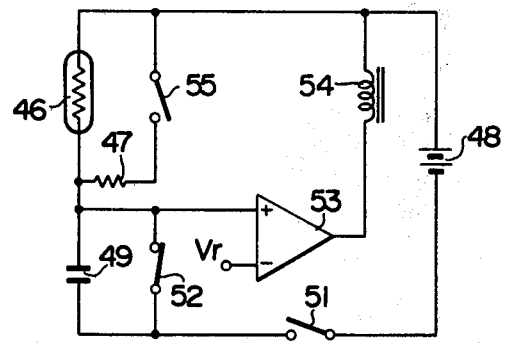
FIG. 7 is a circuit diagram of a shutter control circuit including a flash photography exposure period presetting switch shown in FIG. 6.

The position detecting switch 55 comprises a pair of leaf springs secured to the other end of the mounting detecting member 56 at their one end. The free end of one of the movable contacts extends into a path of movement of the lug 35a on the flash interlock member 35. The position detecting switch 55 is closed by the lug 35a, as indicated in phantom lines, only when the mounting detecting member 56 moves to the left and the flash interlock member 35 moves to the right. As shown in FIG. 7, the position detecting switch 55 is arranged to connect a time constant resistor 47 in shunt with the photometric element 46.

Other components and elements are constructed in a similar manner as those shown in FIGS. 2 to 5, and accordingly are designated by like reference characters as before.

In operation, when the electronic flash 21 is mounted on the camera 1 before effecting a flash photography, the connection boss 21a which fits in the connection recess 2a drives the tab 56a to the left, whereby the mounting detecting member 56 also slides to the left. Subsequently, the knob 9 is operated to cause a sliding movement of the flash interlock member 35 to the right, whereupon the lug 35a formed thereon closes the position detecting switch 55. In this manner, the resistor 47 is connected in shunt with the photometric element 46 to determine an exposure period to be used during a flash photography. The power switch 38 within the electronic flash 21 is closed to initiate a charging of the main capacitor thereof.

After the completion of charging of the main capacitor, a shutter release button may be depressed, whereby there takes place a flash photographing operation with an exposure period which is nearly constant, in the similar manner as in the previous embodiment shown in FIGS. 2 to 5, since the resistor 47 is connected in shunt with the photometric element 46.

When the electronic flash 21 is dismounted from the camera under the condition enabling a flash photography which is achieved by operating the knob 9, or when the knob 9 is inadvertently operated while not mounting the electronic flash 21 on the camera 1, the mounting detecting member 56 remains at its right-hand position under the resilience of the spring 59, thus preventing the position detecting switch 55 from being closed. Hence, the resistor 47 cannot be connected in shunt with the photometric element 46, and thus the depression of a shutter release button normally effects an EE photographing operation under natural light.

Figure 8:
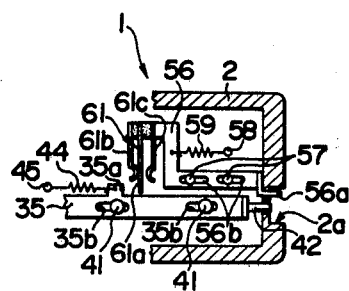
FIG. 8 is a schematic plan view of a photographing mode switching device for a camera according to a further embodiment of the invention.
Figure 9:
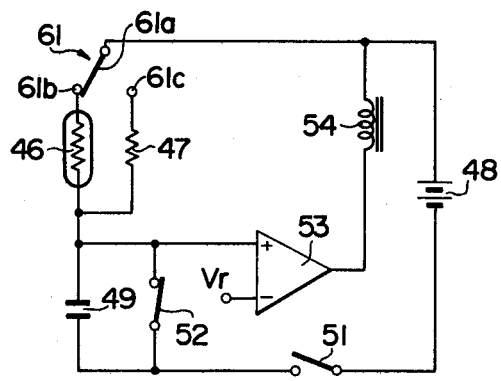
FIG. 9 is a circuit diagram of a shutter control circuit including a photographing mode changeover switch shown in FIG. 8.

FIG. 8 shows a further embodiment of the invention in which the position detecting switch 55 of the embodiment shown in FIGS. 6 and 7 is replaced by a photographing mode changeover switch 61. The switch comprises leaf springs including a movable contact 61a which is centrally disposed and a pair of contacts 61b, 61c which are disposed on the opposite sides of the movable contact 61a. When no external force is applied, the resilience of the movable contact 61a itself normally causes it to engage the contact 61b. However, when the lug 35a on the flash interlock member 35 presses against the movable contact 61a, the latter is moved into contact with the contact 61c. It should be understood that the movable contact 61a is driven by the lug 35a only when the mounting detecting member 56 slides to the left and the flash interlock member 35 slides to the right. As shown in FIG. 9, the movable contact 61a of the switch 61 is connected to the positive terminal of a battery 48 which is used as a power supply in a shutter control circuit while the contact 61b is connected to one end of the photometric element 46 and the contact 61c to one end of the time constant resistor 47.

Other components and elements are constructed in a similar manner as corresponding components or elements shown in FIGS. 2 to 5 or 6 to 7, and hence corresponding parts are designated by like reference characters.

In operation, when the electronic flash 21 is mounted on the camera 1 and the knob 9 is operated, the mounting detecting member 56 and the flash interlock member 35 move toward each other, whereby the lug 35a causes the movable contact 61a to be switched from the contact 61b to the contact 61c. When the switch is so switched, the photometric element 46 is disconnected from the circuit while the resistor 47 alone is connected in series with the integrating capacitor 49, so that an exposure period to be used during a flash photography is established which is determined by the resistance of the resistor 47 and the capacitance of the capacitor 49. The depression of a shutter release button under this condition effects a flash photography with an exposure period thus determined.

When the electronic flash 21 is dismounted under this condition or when the knob 9 is inadvertently operated while the electronic flash 21 is not mounted, the mounting detecting member 56 moves to its rightmost position under the resilience of the spring 59, so that the movable contact 61a engages the contact 61b, thus disconnecting the resistor 47 from the circuit and connecting the photometric element 46 in series with the integrating capacitor 49. Consequently, the depression of a shutter release button effects a normal EE photography under natural light.

What is claimed is:

1. A photographing mode switching device for use in a camera of the type which is adapted to cooperate with an electronic flash which may be detachably mounted thereon to permit a selective switching between an EE photographing mode under natural light and a flash photographing mode; the device comprising:
   a mode switching member which normally establishes an EE photographing mode in the camera and which switches the operating mode of the camera to a flash photographing mode in response to an external operation;
   a position detecting member for detecting the displacement of the mode switching member to a position in which it establishes the flash photographing mode;
   a mounting detecting member for detecting the fact that an electronic flash has been mounted on the camera;
   and an electrical shutter control circuit for presetting an exposure period to be used during a flash photography only when said both detecting members have detected the position and the mounting, respectively.

2. A device according to claim 1 in which the position detecting member is in the form of a normally open switch formed by leaf springs while the mounting detecting member is in the form of a normally open switch formed by leaf springs, the both switches being electrically connected in series with each other so as to connect a time constant resistor, which is used to define an exposure period to be used during a flash photography, in shunt with a photometric element in the shutter control circuit whenever they are both closed.

3. A device according to claim 1 in which the mounting detecting member fixedly carries a tab on one end thereof which is adapted to detect the mounting of an electronic flash and carries the position detecting member on its other end, and is slidable, whenever it has detected the mounting of the electronic flash, to a position where the position detecting member is capable of detecting the displacement of the mode switching member.

4. A device according to claim 3 in which the position detecting member comprises a normally open switch formed by leaf springs, and when closed, connects a time constant resistor, which is used to define an exposure period to be used during a flash photography, in shunt with a photometric element in the shutter control circuit.

5. A device according to claim 3 in which the position detecting member comprises a changeover switch having its movable contact normally engaged with one of transfer contacts which connects a photometric element of the shutter control circuit in series with an integrating capacitor to establish an EE photographing mode, the movable contact being switched, when the electronic flash is mounted on the camera and the mode switching member establishes a flash photographing mode, to the other transfer contact which connects a time constant resistor in series with the integrating capacitor to define an exposure period to be used during a flash photography.

6. A device according to claim 5 in which the changeover switch has its transfer contacts disposed on the opposite sides of the movable contact, all of the contacts being formed by leaf springs.

7. A device according to claim 1 in which the mode switching member comprises an externally operated knob, the camera including a flash enabling ring on which the knob is fixedly mounted and a flash interlock member which is driven to operate the position detecting member as the ring is angularly driven by the knob.

8. A device according to claim 7 in which the flash interlock member is slidable to open or close a power switch of the electronic flash through a junction between the camera and the electronic flash.

* * * * *